United States Patent [19]

Scheuer et al.

[11] 3,764,871

[45] Oct. 9, 1973

[54] STARTING CIRCUIT FOR INDUCTION MOTOR

[75] Inventors: Paul R. Scheuer, West Lafayette; Victor H. Zane, Connersville; Steven B. Sample, West Lafayette, all of Ind.

[73] Assignee: Design & Manufacturing Corporation, Connersville, Ind.

[22] Filed: May 27, 1971

[21] Appl. No.: 147,506

Related U.S. Application Data

[63] Continuation-in-part of Ser. No. 22,552, March 25, 1970, abandoned.

[52] U.S. Cl. ........... 318/207 R, 318/221 R, 318/227
[51] Int. Cl. ............................................. H02p 1/42
[58] Field of Search .................... 318/221 R, 221 E, 318/227, 207 R, 207 A, 207 B

[56] References Cited
UNITED STATES PATENTS

| | | | |
|---|---|---|---|
| 3,538,411 | 11/1970 | Knauer et al. | 318/221 E |
| 3,414,789 | 12/1968 | Prouty | 318/221 E |
| 3,489,969 | 1/1970 | Knauer et al. | 318/221 E |
| 3,530,348 | 9/1970 | Conner | 318/221 E |

*Primary Examiner*—Gene Z. Rubinson
*Attorney*—Melville, Strasser, Foster & Hoffman

[57] ABSTRACT

A circuit for the automatic starting of an induction motor of the type having a main or running winding and at least one phase or starting winding. The starting circuit comprises a current sensing means which is series connected with the main or running winding to a source of electrical power. Said sensing means is also series connected to the combination of a memory circuit and a threshold detection means. The high current drawn by the main or running winding, when initially energized, is sensed by the current sensing means and, when sufficiently high, a signal is passed to an interfacing device between a power source and the starting winding by the memory circuit and the detection means calibrated to pass the signal at voltages in excess of that voltage of the signal which exists when the motor is running at normal speed. This signal is present at the gate of the interfacing device during the entire time that the phase or starting winding is to be energized. The interfacing device, in turn, connects the phase or starting winding of the motor to the power source. When the motor approaches normal running speed and the initial high current drawn by the main or running winding diminishes, the phase or starting winding of the motor will be disconnected from the power source through the action of the calibrated detection means, the memory circuit and deenergization of the gate of the interfacing device.

20 Claims, 20 Drawing Figures

INVENTOR/S
PAUL R. SCHEUER,
VICTOR H. ZANE,
and STEVEN B. SAMPLE

BY *Melville, Strasser, Foster and Hoffman*
ATTORNEYS

INVENTOR/S
PAUL R. SCHEUER
VICTOR H. ZANE
STEVEN B. SAMPLE

BY *Melville, Strasser, Foster and Hoffman*
ATTORNEYS

INVENTORS
PAUL R. SCHEUER
VICTOR H. ZANE
STEVEN B. SAMPLE

BY *Melville, Strasser, Foster and Hoffman*
ATTORNEYS 3,764,871

STARTING CIRCUIT FOR INDUCTION MOTOR

CROSS-REFERENCE TO RELATED APPLICATION

This is a continuation-in-part of the copending, now abandoned application of the same inventors, Ser. No. 22,552, filed Mar. 25, 1970 and entitled STARTING CIRCUIT FOR INDUCTION MOTOR.

BACKGROUND OF THE INVENTION

1. Field of the Invention

The present invention relates to an automatic starting circuit for an induction motor, and more particularly for an induction motor of the type having a main or running winding and at least one phase or starting winding.

2. Description of the Prior Art

In general, motors of the induction type commonly used in high torque applications are built with a winding used for economical running operation (hereinafter called the main or running winding), and a second winding (hereinafter called the starting winding) used only momentarily to assist the main winding in rapidly attaining a running speed in the desired direction. Such motors are normally equipped with internal centrifugal switches that automatically energize the starting winding, whenever the rotor speed is below a predetermined level.

Where external switching is required, for servicing purposes or other reasons, a current operated relay, closely calibrated for the application, is used and is located externally of the motor. The coil of such relay, being series connected with the main winding of the motor, magnetically moves an armature at a predetermined level of electrical current. It will be understood by one skilled in the art that the current in the main winding is considerably higher at low rotor speeds. Contacts affixed to or operated by the relay armature are series connected with the starting winding of the motor, causing it to be energized until a desirable operating rotor speed is attained.

Neither the internal centrifugal switching devices nor the externally located electro-magnetic devices are capable of offering the high level of reliability often required by the present day applications to which such induction motors are put. This is true because of arcing and wear problems associated with centrifugal switching devices and the reliance on very small forces for the operation of electromagnetic devices. In addition, it has been found that failure of the relay-type switch is most often the result of insufficient force available to break apart contacts that have been slightly welded by the motor currents being switched. Such failure may result in the destruction of the motor being controlled.

Another approach is taught in United States Letters Pat. No. 3,226,620. This patent teaches the use of a magnetic coupling to monitor the main winding current and the use of the resulting signal to energize the starting winding each half cycle of the line voltage, while the main winding current is above the normal running value. This method, however, requires the prediction of and correction for the phase relationship of the line voltage and the main winding current, so that the starting winding will be energized near the zero crossing of the line voltage. This action is known to those skilled in the art as zero point switching. The correction for the phase shift is accomplished by fixed components and the system is therefore sensitive to variations in the phase relationship.

In United States Letters Patent No. 3,414,789 a start signal is sent to the gate of an interfacing device and the characteristics of the interfacing device itself are depended upon to establish on and off thresholds. However, thresholds established in this manner are not consistent, due to variations in the characteristics of the interfacing device.

The circuitry of the present invention is characterized by a high level of reliability. There are no moving parts; no dependence on triggering action initiated by marginal mechanical force; and no air-gap contacts controlling large inductive currents. This circuitry is also not sensitive to variations in the phase relationship in the motor and zero point switching is accomplished always. In addition, the circuitry of the present invention is adaptable to perform the motor start function for a reversing motor, as will be shown hereinafter.

Finally, the circuitry of the present invention may be provided with a bi-level threshold detection means to establish a first threshold for the signal to turn on the starting winding and a second threshold for the signal to turn off the starting winding, whereby to stabilize the action of the interfacing device. This is particularly useful in instances where the difference between the sensed voltage during the motor starting condition and the sensed voltage during the motor running condition is small.

SUMMARY OF THE INVENTION

In its most basic form, the invention comtemplates the use of a sensing means, a memory circuit and a threshold detection means.

In one embodiment of the present invention the sensing means is a small sensing transformer. The primary portion of the transformer is connected in series with the running winding of an induction motor. The secondary portion of the transformer supplies a voltage signal output that is essentially proportional to the current drawn by the motor running winding.

When power is applied to the running winding of the motor, the high current initially drawn in trying to start the rotor passes through the primary winding of the transformer, creating a relatively high level of time varying magnetic flux which induces a relatively high voltage level in the secondary winding. For purely sinusoidal current, this voltage is substantially equal to the potential drop across the primary multiplied by the turns ratio of the transformer.

The transformer is specifically designed such that its output may be used to drive a memory circuit, which in turn drives a threshold detection means in the form of a break-over device to energize the gate of an interfacing device or bi-directional semiconductor switch connecting the starting winding of the motor to the source of electrical power. The output of the transformer is converted to a DC signal which is present during the entire time the starting winding is to be energized. The last mentioned switch will conduct until the rotor of the motor has attained a suitable operating speed, as indicated by its operating current. At current levels near those occurring when the motor is running at normal speed, the voltage level of the transformer output will be insufficient to pass through the break-over device, causing the bi-directional semiconductor switch to be non-conducting, thus disconnecting the starting winding from the power source.

In a second embodiment taught herein, the starting circuit of the present invention (including a sensing means, a memory circuit and threshold detection means similar to that used in the first embodiment) is applied to an induction motor having a running winding and two starting windings, one for clockwise rotation of the rotor and one for counter-clockwise rotation of the rotor.

The main winding of the motor is connected to a source of electrical current through a bi-directional semiconductor switch, the gate of which is energized by a signal from an integrated logic circuit.

The first and second starting windings of the motor are similarly connected to the source of electrical current by bi-directional semiconductor switches. The gate of each of these last mentioned switches is connected to the output of the starting circuit through a switching transistor. The bases of the switching transistors are connected directly to signal outputs of the integrated logic circuit. A signal from the logic circuit will be sent to one or the other of the two switching transistors at all times during the operation of the motor.

A third embodiment is similar to the second. However, the output of the starting circuit is applied through a resistor to the base of a transistor which is connected between a DC source and the collectors of two switching transistors which are connected to the gates of bi-directional semiconductor switches. The addition of the third transistor and related components to the circuit of the second embodiment serves to decrease the amount of current which the starting circuit is required to supply to the two switching transistors by adding a stage of amplification.

A fourth embodiment illustrates the principles of the present invention as applied to a device having a conventional timer means and a reversing motor.

In the embodiment of the present invention, a resistor may be substituted for the sensing transformer as a means of sensing the main winding current. Similarly, under some circumstances, a glow lamp or other bi-directional break-over device may be used in lieu of a unidirectional break-over device such as a zener diode.

Finally, the embodiment of the present invention may be provided with a bi-level threshold detection circuit, such as a Schmitt trigger, as will be described hereinafter.

DESCRIPTION OF THE PREFERRED EMBODIMENTS

The starting circuits of the present invention may be used in substantially any application entailing the operation of an induction motor having at least one starting winding. For example, it may be used in association with an automatic household appliance. For purposes of an exemplary showing, the embodiments hereinafter described will be shown as used in an automatic dishwashing machine. It will be understood by one skilled in the art that this application of the circuits of the present invention is exemplary only, and is not intended to be limiting.

Figure 1:
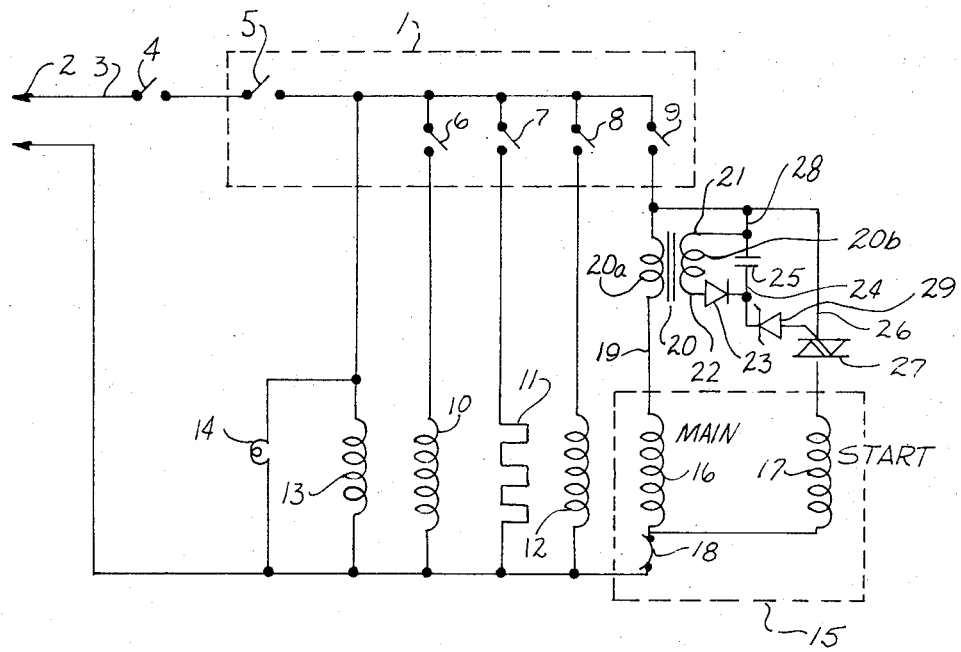
FIG. 1 diagrammatically illustrates one embodiment of the starting circuit of the present invention.

FIG. 1 is a diagrammatic illustration of one embodiment of the starting circuit of the present invention, as used in a typical dishwashing machine. In general, automatic dishwashers are arranged to carry on a plurality of operations in sequence. The series of operations is frequently referred to as "cycles." For example, a typical automatic dishwasher is arranged to carry on in sequence a series of operations which may be designated as first wash, first rinse, second rinse, second wash, third rinse, fourth rinse, dry.

The carrying on of this or some other cycle of operations is controlled by a timer which energizes or deenergizes substantially all of the electro-mechanical machine components (such as solenoids, motors, lights, etc.). Various varieties of timers are well known in the art. Generally, a timer will comprise a motor. In some instances, the motor drives a device like a commutator which results in sequential and in some instances simultaneous opening and closing of electric switches. In other instances, the timer motor drives a rotating element which is provided with camming surfaces operating electric switches.

In the simplified diagrammatic illustration of FIG. 1, a timer 1 of any suitable type is shown as being connected to a source of AC electrical current 2 by means of lead 3. Lead 3 may contain a switch 4, which is a door interlock switch, assuring that the machine is disconnected when the door is open. The timer 1 will contain and control a plurality of switches such as an end-of-cycle switch 5, a water valve switch 6, a heater switch 7, a drain valve switch 8, and a motor power switch 9. The water valve, heater and drain valve are diagrammatically indicated at 10, 11 and 12, respectively. The timer motor is shown at 13. A pilot light may be provided as at 14. It will be understood by one skilled in the art that the timer may control a plurality of additional appurtenances (not shown) such as a timer rapid advance motor, a detergent dispenser and the like.

The induction motor of the dishwasher is diagrammatically indicated by the broken line rectangle 15. This motor may drive an impeller and/or a pump means. The main or running winding of the motor is shown at 16 and the starting winding is shown at 17. The motor may be provided with a protective device such as a circuit breaker or the like. Such a protective device is shown at 18.

The main or running winding 16 of the motor 15 is connected through lead 19 to the motor power switch 9 of the timer 1. The lead 19 contains the primary portion 20a of a transformer 20. During a machine cycle, switches 4 and 5 are closed and the running winding 16 will be connected to the power source upon the closing of switch 9. Initially, a high current will be drawn by the running winding 16. For example, if the motor 15 were a typical 1/3 horsepower 115 volt motor, the main winding would draw an initial current on the order of 18 amperes, which may induce a peak voltage level of about 18 volts in the secondary portion 20b of the sensing transformer 20.

Leads 21 and 22 extend from the secondary portion 20b of the sensing transformer 20. Leads 21 and 22 are connected to the memory circuit comprising a series combination of a rectifying diode 23 of any suitable type and a capacitor 25.

The starting winding 17 of the motor 15 is connected to lead 19 by lead 26. Lead 26 contains an interfacing device in the form of a bi-directional semiconductor switch 27. The juncture of leads 21 and 24 is connected by lead 28 to lead 26. The juncture of lead 22 and 24 is connected to the gate of the bi-directional switch 27 through a threshold detection means comprising a break-over means 29. The break-over means 29 may comprise a bilateral trigger diode, a glow lamp or the like. For purposes of an exemplary showing it is illustrated as being a zener diode.

The AC voltage in the secondary portion 20b of the transformer 20 is peak-detected (i.e., rectified as at 23 and filtered as at 25, the combination of the diode and capacitor comprising a half-wave peak detector) to form a DC signal which varies as the envelope of the voltage in the secondary portion. Thus the diode 23 and capacitor 25 act as a memory circuit which stores from cycle to cycle the positive peak voltage from the sensing means 20. The DC signal from the capacitor 25 acts upon the threshold detection means 29. When, as above mentioned, the motor 15 is of the typical 1/3 horsepower, 115 volt type, the device 29 may be calibrated to break-over at voltages in excess of 10 to 12 volts. Thus, when the main winding is initially energized by closing switch 9, the peak voltage from the sensing transformer 20 into the memory circuit will be about 18 volts, as previously mentioned. Thus the DC voltage from the memory circuit will be about 18 volts, and thus the zener diode 29 will break over, thereby allowing a DC current to flow into the gate of the bi-directional semiconductor switch 27, thereby triggering the switch into conduction, and thereby energizing the starting winding 17. As normal speed is approached by the rotor of the motor 15, the current through the primary portion 20a of the transformer 20 will fall, reducing the voltage appearing across the secondary portion 20b of the transformer. When the peak value of this voltage reaches the break-over level of the zener diode 29, the DC current to the gate of the bi-directional switch 27 will cease and the starting winding 17 will be deenergized. For example, the normal running current of a typical 1/3 horsepower, 115 volt motor is on the order of 6 amperes. Thus, the peak voltage appearing across the secondary portion 20b of the transformer 20 will be well below the exemplary break-over voltage (of 10 to 12 volts) of the zener diode 29. As a consequence, the zener diode 29 will block the triggering current to the gate of the bi-directional switch 27.

In the embodiment of FIG. 1 the transformer 20 comprises the sensing means; the diode 23 and capacitor 25 comprise the memory circuit; and the break-over device 29 comprises the detection means.

Figure 2:
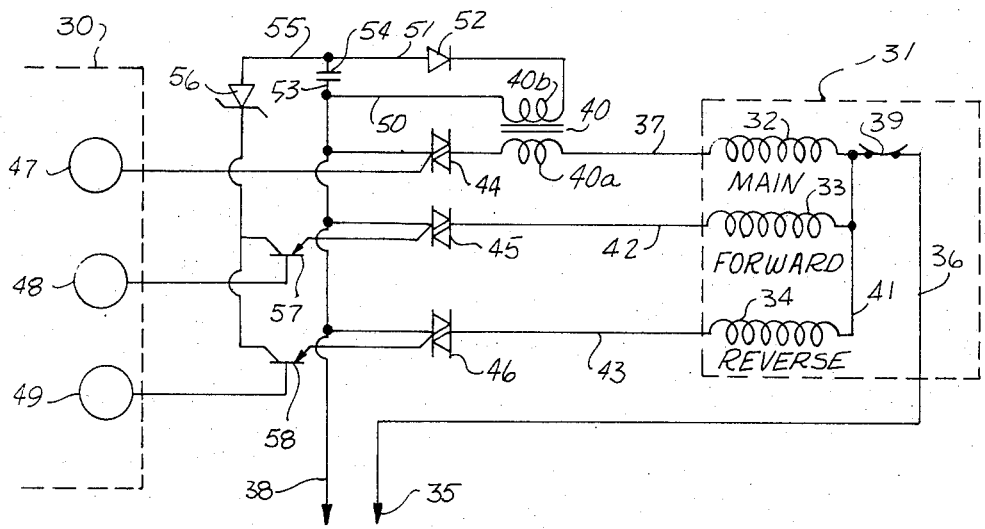
FIG. 2 diagrammatically illustrates another embodiment of the starting circuit of the present invention.

FIG. 2 illustrates the application of the principle of the present invention to a dishwashing machine wherein the typical type of timer is replaced by an integrated logic circuit controlling all electromechanical machine components with low power output signals. Such an appliance is taught in the copending application Ser. No. 138,265, filed April 29, 1971, in the names of STEVEN B. SAMPLE, PAUL R. SCHEUER, STEVAN W. SPEHEGER AND KARMEN D. COX, and entitled CONTROL SYSTEM FOR APPLIANCES AND THE LIKE.

In FIG. 2, details of the machine circuit not pertinent to the particular application taught have been omitted for purposes of simplicity. The integrated logic circuit is diagrammatically indicated at 30. An induction motor is diagrammatically indicated at 31. In this instance, however, the motor 31 is shown as having a main or running winding 32 and two starting windings 33 and 34 for clockwise and counter-clockwise rotation of the rotor, respectively. It is common in modern dishwashers to use an induction motor for driving a pump. In one direction of rotation, the pump recirculates washing fluids within the dishwasher vat. In the other direction of rotation, the pump discharges fluids from the dishwasher vat through drain means.

The running winding 32 is connected to a source of AC electrical energy 35 by a lead 36 and leads 37 and 38. It will be noted that lead 36 contains a protective device such as a circuit breaker 39, similar to the protective device 18 in FIG. 1. Lead 37 contains the primary portion 40a of a sensing transformer 40, equivalent to the transformer 20 in FIG. 1.

The starting windings 33 and 34 are connected to the lead 36 (and thus to the source of electrical energy) by lead 41. The starting windings 33 and 34 are also connected to the lead 38 (completing the circuit to the source of electrical energy) by leads 42 and 43, respectively.

It will be noted that leads 37, 42 and 43 each contain a bi-directional semiconductor switch 44, 45 and 46, respectively. Thus, the operation of the main or running winding 32 is controlled by the bi-directional switch 44, while the starting windings 33 and 34 are controlled by the bi-directional switches 45 and 46, respectively.

The integrated logic circuit is diagrammatically shown as having an output for each of the motor windings. Thus, output 47 is shown as connected to the gate of the bi-directional switch 44, controlling the running winding 32. The output 47 produces a current — limited DC signal when motor operation is desired. This signal triggers the gate of bi-directional switch 44, thereby completing the connection of the running winding 32 to the source of electrical power. As will be described hereinafter, outputs 48 and 49 produce current-limited DC signals intended to control starting windings 33 and 34, respectively.

As in the case of the embodiment of FIG. 1, the sensing transformer 40 has a secondary portion 40b with leads 50 and 51. The lead 51 contains a rectifying diode 52 of any suitable type and similar to the rectifying diode 23 of FIG. 1. The leads 50 and 51 are connected by lead 53 containing a capacitor 54. The capacitor 54 serves much the same purposes as the capacitor 25 in FIG. 1. The diode 52 and the capacitor 54 comprise the memory circuit similar to the memory circuit of FIG. 1 except that in FIG. 2 the memory circuit stores from cycle to cycle the negative peak voltage from the sensing means 40. The juncture of leads 50 and 53 is connected to lead 38. The juncture of leads 53 and 51 is connected to lead 55 containing a break-over device 56, of any suitable type and comprising the detecting means. Again, for purposes of an exemplary showing, the threshold detection means is represented as a break-over device comprising a zener diode 56. It will be noted that the zener diode 56 is connected to the collectors of two switching transistors 57 and 58. The output 48 of the logic circuit is connected directly to the base of switching transistor 57, while the emitter of switching transistor 57 is connected to the gate of the bi-directional switch 45.

In similar fashion, output 49 of the logic circuit is connected directly to the base of switching transistor 58. The emitter of this switching transistor is connected to the gate of bi-directional switch 46.

Thus it will be seen that the output of the zener diode 56 will energize the gate of bi-directional switch 45 or the gate of bi-directional switch 46, depending upon which of the switching transistors 57 and 58 is receiving a signal from its respective logic circuit output.

Whenever motor operation is desired, the output 47 of the logic system and one or the other of outputs 48 and 49 will produce a signal, depending upon the desired direction of rotation of the motor rotor. The operation of the sensing transformer, rectifying means 52, capacitor 54 and break-over means 56 is substantially identical to that described with respect to the corresponding elements in the embodiment of FIG. 1. Thus, depending upon the desired direction of rotation, either starting winding 33 or starting winding 34 will be energized whenever the initial high current drawn by running coil 32 is sensed by transformer 40, and the voltage across the secondary portion 40b of the transformer has a peak value above the break-over point of the zener diode 56. Selection between starting coil 33 and starting coil 34 will be made by the logic circuit through output 48 and its respective switching transistor 57 or output 49 and its respective switching transistor 58. In this way, the output of zener diode 56 will energize the gate of either bi-directional switch 45 or bi-directional switch 46, thereby connecting starting coil 33 or starting coil 34 to the source of electrical energy 35.

As in the case of the embodiment of FIG. 1, when the rotor of the motor 31 approaches the normal running speed, the peak voltage across the secondary portion 40b of the sensing transformer 40 will fall below the break-over level of the zener diode 56, the gate of bi-directional switch 45 or bi-directional switch 46 will be deenergized, and starting winding 33 or starting winding 34 will be disconnected from the power source 35.

Figure 3:
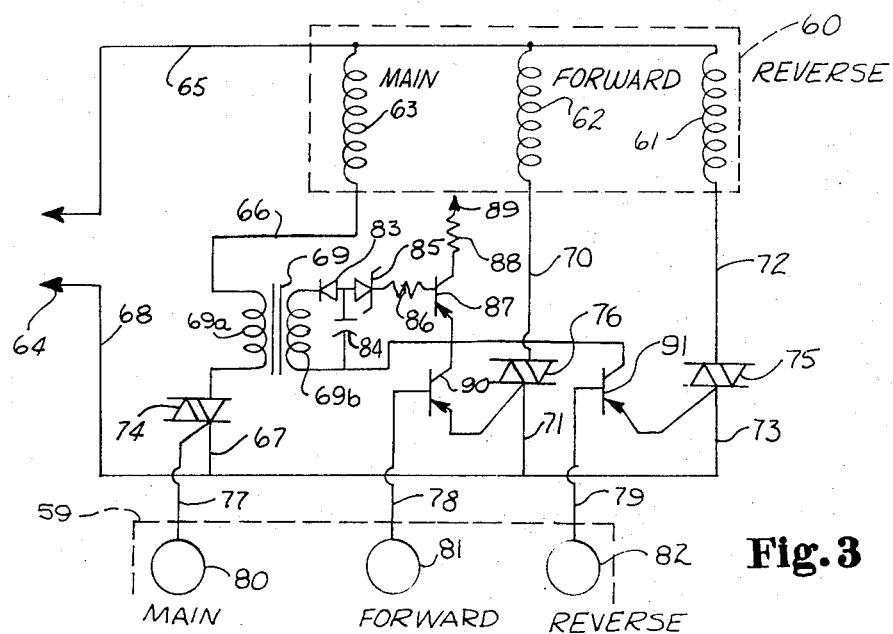
FIG. 3 diagrammatically illustrates another embodiment of the starting circuit of the present invention similar to FIG. 2, but with means to decrease the amount of current required to be supplied to the switching transistors by the starting circuit.

FIG. 3 illustrates the application of a third embodiment of the present invention to a dishwashing machine having an integrated logic circuit controlling all electromechanical machine components, with low power signals. Again details of the machine not pertinent to the present invention have been omitted for clarity.

In FIG. 3 the integrated logic circuit is diagrammatically indicated at 59. The motor 60 is shown as having two starting windings 61 and 62 and one running or main winding 63. The running winding 63 is connected to a source of electrical energy by the lead 65 and the leads 66, 67 and 68. Lead 66 contains the primary portion 69a of a transformer 69, equivalent to transformer 40 and 20 in FIGS. 2 and 1, and comprising the sensing means. The starting windings 62 and 61 are connected to the same source of electrical energy through lead 65 and leads 70–71 and 72–73, respectively. Each of the windings 61, 62, 63 has a bi-directional semiconductor switch connected in series with it. The operation of the main winding 63 is controlled by the bi-directional semiconductor switch 74, while the starting windings 61 and 62 are controlled by the bi-directional semiconductor switches 75 and 76 respectively. The action of the circuit which causes the bi-directional semiconductor switches 75 and 76 to operate will now be described.

The integrated logic circuit 59 is shown as having three output terminals 80, 81 and 82. The integrated logic circuit is specifically designed to produce the following sets of signals at the output terminals 80, 81 and 82.

In a first instance, when it is desired not to have the motor 60 actuated, the main output terminal 80 is electrically connected to ground potential or zero volts. The condition of the forward and reverse output terminals 81 and 82 has no effect on the circuit under these circumstances.

In a second instance, when it is desired to run the motor 60 in the forward direction, a low power negative DC signal will be present at both the main and forward output terminals 80 and 81; the reverse output terminal 82 will be held at zero volts.

In a third instance, when it is desired to run the motor in the reverse direction, a low power negative DC signal will be present at both the main and reverse output terminals 80 and 82; the forward output terminal will be held at zero volts.

For purpose of an exemplary showing, the action of the circuit will be described for the conditions of the second instance mentioned above wherein the motor 60 will be activated in the forward direction.

The output terminal 80 is connected by lead 77 to the gate of a bi-directional semiconductor switch 74 which connects the motor main winding 63 to a source of electrical energy 64 through the primary portion 69a of a sensing transformer 69. The low power DC signal at the gate of switch 74 causes switch 74 to be in the conducting state resulting in a relatively high current flow through the primary portion 69a of the transformer 69. This current causes a relatively high AC voltage to be induced in the secondary portion 69b of the transformer 69. This AC signal is half-wave rectified by the action of the diode 83 and the capacitor 84, these two elements comprising the memory circuit. It will be noted that the voltage appearing across the capacitor 84 is proportional to the current flowing in the main winding 63. When the voltage which appears across the capacitor 84 is in excess of the break-over voltage of the zener diode 85 (the threshold detection means) a DC current will flow through the resistor 86 into the base of the transistor 87. Under the conditions just described, which will exist during the time that the motor is coming up to normal running speed, the transistor 87, which is connected through a current limiting resistor 88 to a DC power source 89, will be in a conducting state. The presence of a DC signal at the forward output terminal 81, which is connected by lead 78 to the base of the switching transistor 90, causes transistor 90 to be in the conducting state. Under these conditions the current from the supply 89 is passed to the gate of the bi-directional semiconductor switch 76. This current causes switch 76 to be in the conducting state which connects the forward starting winding 62 to the source of electrical energy 64 through leads 65, 70, 71 and 68.

When the motor 60 approaches the normal running speed, the current in the main winding 63 decreases as described earlier. This decrease causes a corresponding decrease in the voltage stored on the capacitor 84. The circuit is designed so that this voltage at normal running speed is less than the break-over voltage of the zener diode 85. This causes the current to the base of the transistor 87 to be blocked, resulting in the transistor 87 being "turned off." This action serves to disconnect the switching transistor 90 from the DC power supply 89 causing the current in the gate of switch 76 to fall to zero which, in turn, causes the bi-directional semiconductor switch 76 to be in the non-conducting state, thereby disconnecting the starting winding from the source of electrical energy 64.

During the forward motor starting action just described the bi-directional semiconductor switch 75, which controls the reverse starting winding, remains off due to the non-conducting state in which the transistor 91 is kept in the absence of a signal from the output terminal 82.

The integrated logic circuit output terminal conditions of the above third mentioned instance (wherein the motor 60 will be activated in the reverse direction) result in the interchanging of the action of the switching transistors 90 and 91 and of the di-directional semiconductor switches 76 and 75. The action of the remaining parts of the circuit is identical to the action described above with respect to the second instance.

For the conditions of the first instance (wherein the motor 60 is off) no action takes place since the bi-directional semiconductor switch 74 remains in the non-conducting state which causes the main motor winding 63 to be disconnected from the source of electrical energy 64. Thus also there is no output from the secondary 69b of the sensing transformer 69, and hence neither start winding 61 not 62 is energized.

It will be understood by those skilled in the art that, as compared to the embodiment of FIG. 2, the addition of transistor 87, power source 89 and related components to the circuit of FIG. 3 serves to decrease the amount of current which the starting circuit is required to supply to the switching transistors by adding the step of amplification.

Figure 4:
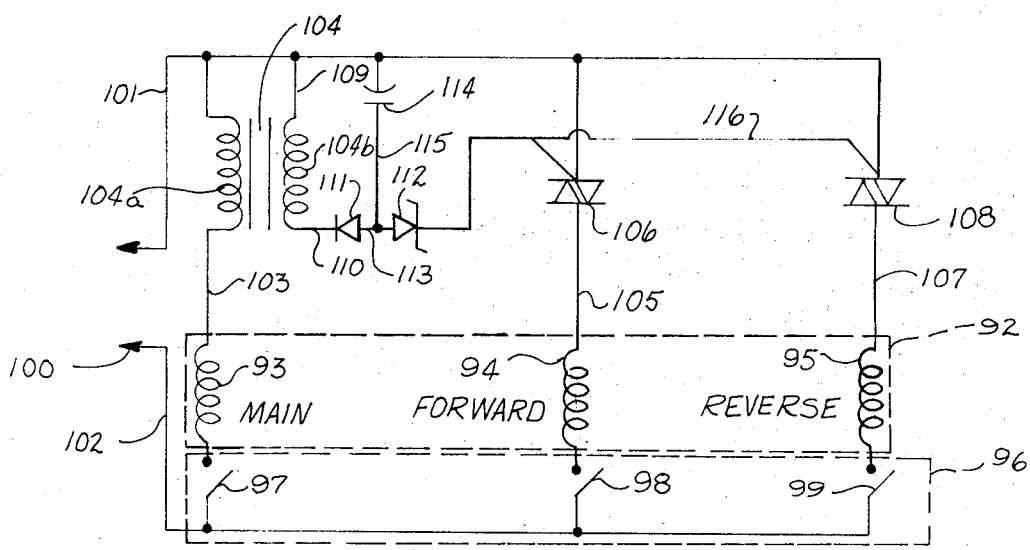
FIG. 4 diagrammatically illustrates yet another embodiment of the starting circuit of the present invention.

FIG. 4 illustrates an embodiment of the circuit of the present invention when applied to a dishwashing machine or the like having a reversing motor and a conventional timer. The reversing motor is diagrammatically represented by the broken line rectangle 92 and is shown as being provided with a main or running winding 93, a forward phase winding 94 and a reverse phase winding 95. The conventional timer (which may be of any of the above mentioned types) is indicated by the broken line rectangle 96 and is shown as having three switches therein, 97, 98 and 99. It will again be understood by the one skilled in the art that details of the machine circuit not pertinent to the particular application taught have been omitted for purposes of clarity.

A source of power is diagrammatically indicated at 100 and has leads 101 and 102 extending therefrom. A lead 103 extends across leads 101 and 102 and contains in series the timer switch 97, the main winding 93 and the primary portion 104a of a sensing transformer 104, the sensing means. A lead 105 extends from lead 102 to one side of lead 108 and contains in series timer switch 98 and forward phase winding 94. Similarly, a lead 107 extends from lead 102 to the above mentioned side of lead 108 and contains in series timer switch 99 and reverse phase winding 95. The other side of lead 108 is connected to lead 101 and contains a bi-directional semiconductor switch 106.

The secondary portion 104b of the sensing transformer 104 has leads 109 and 110 extending therefrom. The lead 109 is connected to the lead 101. The lead 110 contains a rectifying diode 111 of any suitable type. The rectifying diode 111 is connected to a break-over device 112 by lead 113. The break-over device 112 can again be of any suitable type (as described above) and for purposes of an exemplary showing is illustrated as being a zener diode. A capacitor 114 is connected between leads 101 and 113 by lead 115. The diode 111 and capacitor 114 comprise the memory circuit, while the break-over device 112 comprises the threshold detection means.

The break-over device 112 is connected to the gate of the bi-directional semiconductor switch 106 by lead 116.

The operation of the circuit of FIG. 4 may be described as follows.

When the motor 92 is desired to be off, the switch 97 of the timer (which controls the main winding) will be open. As a consequence, no current will flow to the main winding. The positions of timer switches 98 and 99, which control phase windings 94 and 95 respectively, will be of no consequence because no current will pass through the primary portion 104a of the transformer 104. As a consequence, no voltage will be induced in the secondary portion 104b of the sensing transformer 104 and the gate of the bi-directional semiconductor switch 106 will not be activated, hence rendering this switch in the non-conducting state.

If the motor is desired to run in its forward direction, timer switches 97 and 98 will be closed, while timer switch 99 will be open. When timer switch 97 is closed, the main motor winding 93 and the primary portion 104b of the sensing transformer 104 will receive current from the source 100. As a consequence voltage will be induced in the secondary portion 104b of the sensing transformer. This last mentioned voltage will be peak detected by the half-wave peak detector combination 114–111. The DC signal from the peak detector combination will pass through break-over device 112 (so long as it is of sufficient magnitude to do so) and activate the gates of the bi-directional semiconductor switch 106.

Under these conditions, bi-directional semiconductor switch 106 will be rendered conducting and, since timer switch 98 is closed, the forward phase winding 94 will be energized. However, since switch 99 is open, the reverse phase winding 95 will not be energized.

When it is desired for the motor 92 to run in reverse, the condition of the circuit will be the same as that described with the motor running forward, with the exception that timer switch 98 will be open and timer switch 99 will be closed. Under these circumstances, the fact that the bi-directional semiconductor switch 106 is rendered conducting will, in combination with the fact that switch 99 is closed, cause the reverse winding 95 to be energized. However, since timer switch 98 is open, the forward phase winding 94 will not be energized.

Figure 5:
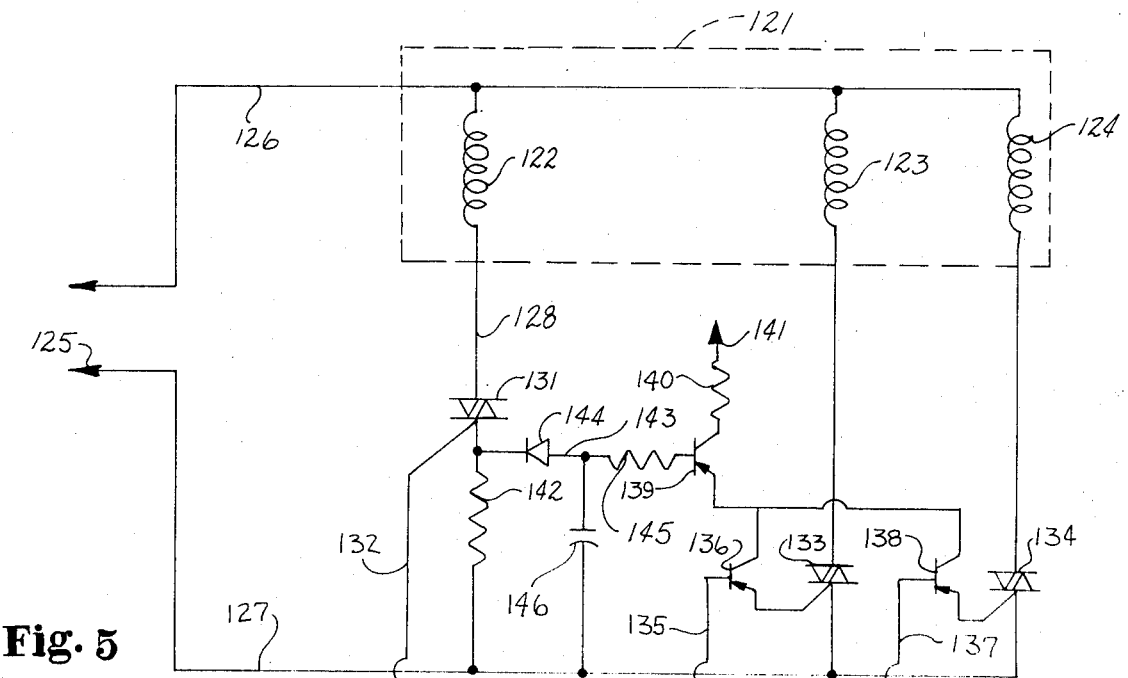
FIG. 5 diagrammatically illustrates an embodiment similar to FIG. 3 wherein a resistor is substituted for the sensing transformer as a means for sensing the main winding current.

In the embodiments thus far described, it is possible to substitute a resistance for the sensing transformer to serve as a sensing means for the main winding current. The resistor has the advantage of being less costly and less space consuming. For purposes of an exemplary showing, FIG. 5 illustrates a circuit substantially identical to that shown in FIG. 3, but wherein a resistor is used as the sensing means. In FIG. 5, an integrated logic circuit 117 having outputs 118, 119 and 120 is shown, and is equivalent to the integrated logic circuit 59 of FIG. 3 with its outputs 80, 81 and 82. A motor 121 is shown having a main winding 122 and starting windings 123 and 124, equivalent to the motor 60 of FIG. 3 with its main winding 63 and starting windings 62 and 61.

A source of electrical energy is diagrammatically indicated at 125 and has leads 126 and 127 extending therefrom. The main winding 122 is connected across leads 126 and 127 by lead 128. In similar fashion, starting windings 123 and 124 are connected across leads 126 and 127 by leads 129 and 130, respectively. The lead 128 has, in series with the main winding 122, a bi-directional semiconductor switch 131, the gate of which is connected by lead 132 to the output 118. The switch 131 is equivalent to the switch 74 of FIG. 3. Lead 129 has, in series with starting winding 123, a bi-directional semiconductor switch 133, equivalent to switch 76 of FIG. 3. Lead 130 has, in series with starting winding 124, a bi-directional semiconductor switch 134, equivalent to switch 75 of FIG. 3. The gate of the bi-directional semiconductor switch 133 is connected by lead 135 to output 119 through a switching transistor 136. The switching transistor 136 is equivalent to transistor 90 of FIG. 3. In similar fashion, the gate of the bi-directional semiconductor switch 134 is connected through lead 137 to output 120 through switching transistor 138, equivalent to transistor 91 of FIG. 3.

It will be noted that the collectors of switching transistors 136 and 138 are connected to the emitter of transistor 139. Transistor 139 is equivalent to transistor 87 of FIG. 3 and has its collector connected through a current limiting resistor 140 to a DC power source 141, in the same manner as taught with respect to FIG. 3.

The primary difference between the cricuit of FIG. 5 and the circuit of FIG. 3 lies in the fact that the circuit of FIG. 5 does not include a sensing transformer. Rather, the circuit includes a sensing resistor 142 in the lead 128 and in series with the bi-directional semiconductor switch 131 and the main winding 122. A lead 143 extends between the lead 128 and the base of the transistor 139 and contains a diode 144, a zener diode 146a, and a resistor 145 which are equivalent respectively to zener diode 83 and resistor 86 in FIG. 3. A capacitor 146 is connected across leads 127 and 143, and is equivalent to capacitor 84 in FIG. 3.

The operation of the circuit may be described as follows. When it is desired to start the motor in the forward direction, a low-power DC signal will be present at both the main and forward output terminals 118 and 119 of the integrated logic circuit. The reverse output terminal 120 will be held at zero volts.

The low-power DC signal from the output 118 will exist at the gate of the bi-directional semiconductor switch 131, rendering it in the conducting state. This results in a relatively high current flow through the resistor 142. The AC voltage appearing across the resistor 142 is proportional to the current through the resistor. This signal is peak detected by the action of diode 144 and capacitor 146. It will be understood by one skilled in the art that the voltage appearing across the capacitor 146 is proportional to the current flowing in the main winding 122.

When the voltage which appears across the capacitor 146 is in excess of the break-over voltage of the zener diode 146a, current flows through the resistor 145 to the base of transistor 139, thereby causing transistor 139 to conduct. Since the transistor 139 is connected to a DC power source 141 through the current limiting resistor 140, a DC signal will be present at the collectors of switching transistor 136 and 138. Since a low-power DC signal is present at the base of switching transistor 136 from the output 119 of the integrated logic circuit, the switching transistor will be in the conducting state and will, in turn, energize the gate of the bi-directional semiconductor switch 133 rendering it conductive. Under these conditions, the forward starting winding 123 will be connected to the source of electrical energy 125.

At the same time, although a signal exists at the collector of switching transistor 138, since no signal exists at its base from the output 120, it will not be rendered conductive. As a consequence, the gate of the bi-directional semiconductor switch 134 will not be energized and that switch will be non-conductive. Thus, the reverse starting winding will not be energized.

When the motor 121 approaches the normal running speed and the current in the main winding 122 decreases, this decrease causes a corresponding decrease in the voltage stored in capacitor 146. The circuit is so designed that this voltage will be less than the break-over voltage of zener diode 146a, and thus current will not flow through resistor 145 to the base of transistor 139, and thus transistor 139 will be rendered non-conductive. This action serves to block the flow of current through switching transistor 136, and hence the current into the gate of the bi-directional semiconductor switch 133 falls to zero. This, in turn, causes the bi-directional semiconductor switch 133 to be in the non-conducting state, thereby disconnecting the forward starting winding from the source of electrical energy 125.

The integrated logic circuit output terminal conditions when the motor is to be activated in the reverse direction are such as to result in the interchanging of the action of switching transistors 136 and 138 and of the bi-directional semiconductor switches 133 and 134. The action of the remaining part of the circuit is identical to that described above, and the reverse starting winding will be energized until the motor approaches its normal running speed, whereupon the reverse motor winding will be de-energized. The forward starting winding will remain de-energized under these conditions.

Under those circumstances when the motor 121 is in its "off" condition, no action takes place since no signal is sent to the gate of the bi-directional semiconductor switch 131 from output 118 of the integrated logic circuit. Therefore, the switch 131 remains in the non-conducting state and the main motor winding 122 remains disconnected from the source of electrical energy 125. Thus also there is no voltage developed at the sensing resistor and hence transistor 139 is non-conductive, and hence neither starting winding 123 not 124 is energized.

Figure 7:
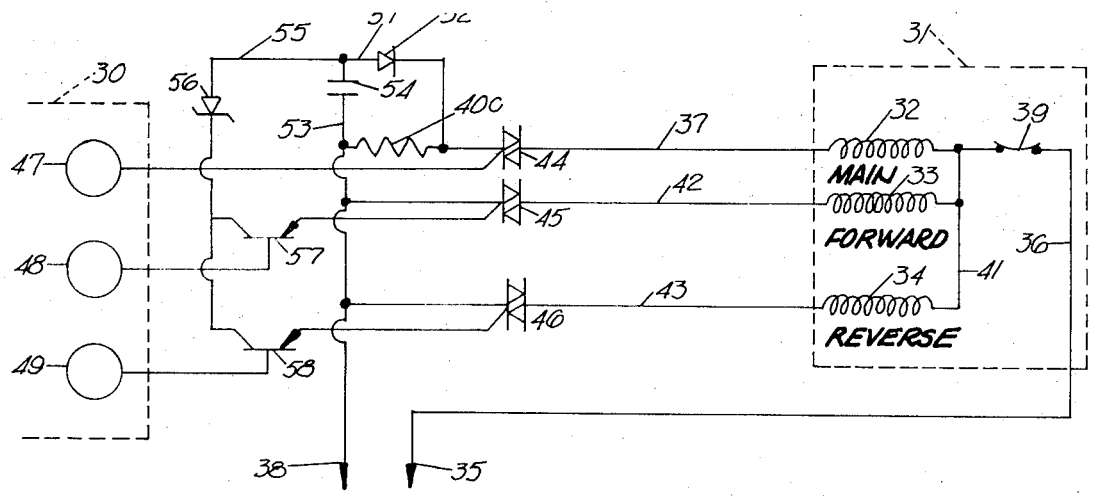
FIG. 7 diagrammatically illustrates the circuit of FIG. 2 wherein a sensing resistor is substituted for the sensing transformer.

In similar fashion, a sensing resistor may be substituted for the sensing transformer 40 in FIG. 2. This is illustrated in FIG. 7, wherein like parts have been given like index numerals. The sensing resistor is shown at 40c in lead 37 in series with the main or running winding 32. With the exception of the use of a sensing resistor, rather than a transformer, the operation of the circuit of FIG. 7 is substantially identical to that described with respect to FIG. 2.

In those embodiments described above in which the voltage to be detected by the threshold detecting means is sufficiently high, it is possible to substitute a glow lamp or other bi-directional break-over device for the undirectional zener diode.

Figure 6:
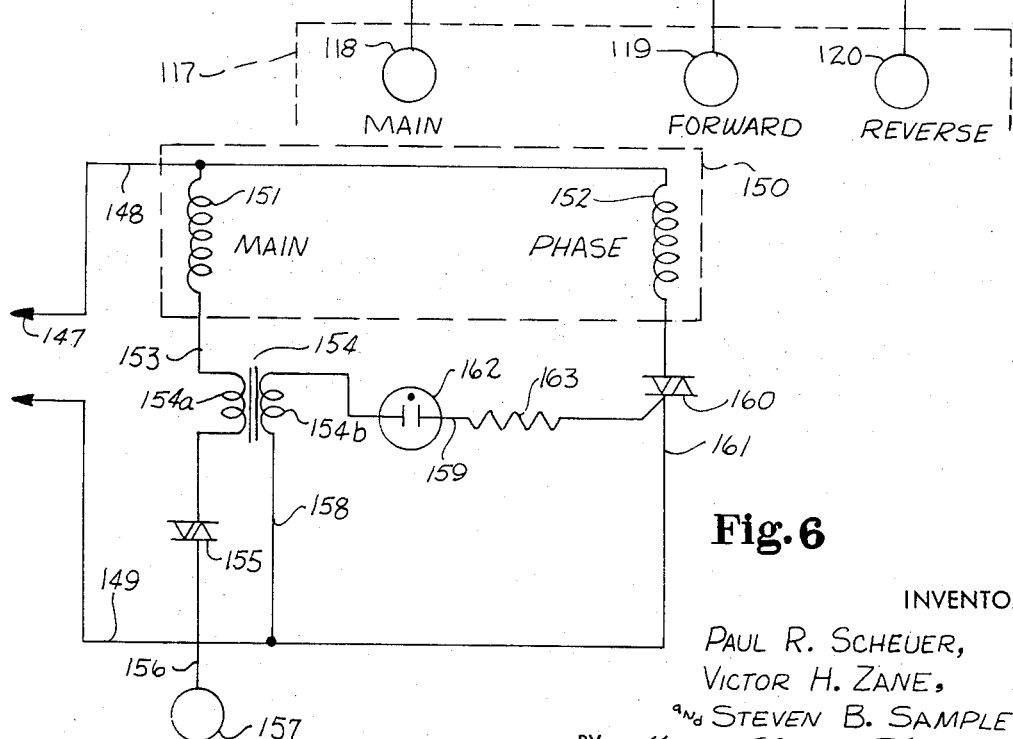
FIG. 6 diagrammatically illustrates the use of a glow lamp in lieu of the unidirectional zener diode.

FIG. 6 illustrates a simple circuit wherein a glow lamp is used. A source of electrical energy is indicated at 147 with leads 148 and 149 extending thereffrom. A motor is shown by the broken line rectangle 150 and is provided with a main winding 151 and a starting winding 152. The main winding is connected across leads 148 and 149 by lead 153. The lead 153 contains, in series with the main winding 151, the primary portion 154a of a transformer 154. For purposes of this exemplary showing, the lead 153 is also illustrated as having a bi-directional semiconductor switch 155 with its gate connected by lead 156 to an output signal source 157. It will be understood, however, that the switch 155 might be a switch constituting a part of a conventional mechanical timing device. The secondary portion 154b of the transformer 154 is connected by lead 158 to the lead 149. The secondary portion 154b is connected to a memory circuit comprising a peak detecting diode 158a and capacitor 158b. The memory circuit is connected to a threshold detection means comprising a glow lamp 162. The glow lamp is connected through resistor 163 to the gate of a bi-directional semiconductor switch 160 which is in series connection with the starting winding 152 via lead 161. Lead 161 is connected across leads 148 and 149.

When the motor 150 is to be energized, a signal is transmitted to the gate of the bi-directional semiconductor switch 155 from output 157. Switch 155 is then rendered in the conducting state and the main winding 151 is connected across leads 148 and 149 and is therefore connected to the source of electrical energy 147. Under these circumstances, the bi-directional semiconductor switch 160 is triggered into conduction since the output of the current sensing transformer 154 and thus the memory circuit will be in excess of the break-over voltage of the glow lamp 162. When the motor 150 approaches normal running speed, the output of the current sensing transformer and thus the memory circuit will fall below the break-over voltage of the glow lamp 162, the bi-directional semiconductor switch 160 will be rendered non-conductive and the starting winding 152 will be disconnected from the source of electrical energy.

Figure 8:
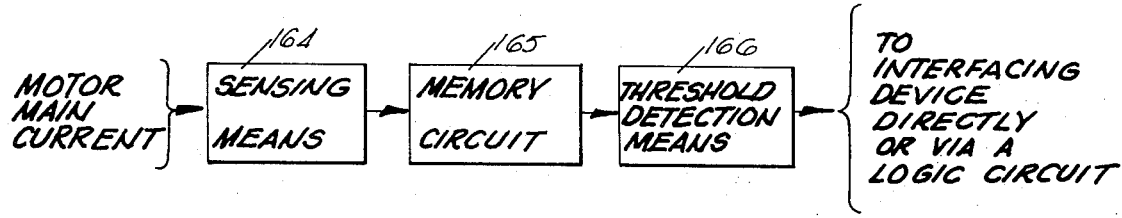
FIGS. 8 and 9 are block diagrams of the primary elements of the starting circuits of the present invention.

FIG. 8 is a block diagram illustrating the primary elements of the starting circuits of the present invention. As indicated in the diagram of FIG. 8, the motor main winding current is sensed by a sensing means 164 which may take the form of a transformer or a sensing resistor. The sensing means procides an instantaneous output proportional to the current through the main motor winding. The output of the sensing means may be fed to a memory circuit 165 which will convert the sensing means output to a slowing varying DC voltage proportional to the peak current in the main motor winding. The memory circuit may take a number of forms, as for example the peak detecting diode-capacitor combinations (which may include a resistor if the circuit requires it) as described above, or a digital memory circuit, as will be illustrated hereinafter. The output of the memory circuit may then be fed into a threshold detection means 166 which determines when the starting winding will be turned on and turned off. The output of the threshold detection means 165 may go directly to the gate of an interfacing device (as in the case of the embodiments of FIGS. 1 and 4), or it may go to the bases of switching transistors as shown, for example, in FIGS. 2, 3, 5 and 7. Alternatively, the output of the threshold detecting means may go to a logic circuit which, in turn, will determine which of the starting windings (if there is more than one) will be actuated.

Figure 9:
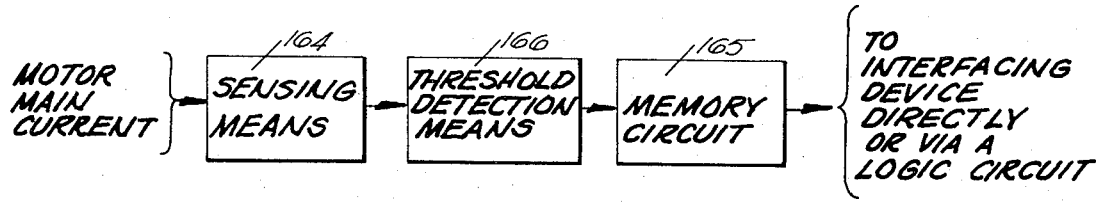

FIG. 9 is similar to FIG. 8 and like parts have been given like index numerals. The purpose of FIG. 9 is simply to illustrate that the output of the sensing means may be fed to the threshold detection means, and the output of the threshold detection means may then be fed to a memory circuit, as will be shown hereinafter.

In the starting circuits thus far described, the threshold detection means has been a single-level one (i.e., the threshold point for turning on the starting winding has been the same as the threshold for turning off the starting winding). In many applications of these circuits, such a single-level threshold detection means is adequate. However, difficulty may arise when the difference between the sensed voltage during the starting condition of the motor and the sensed voltage during the running condition is relatively small, since under these circumstances the transistion through the turn off point occurs through many cycles. Under such conditions, a single threshold point may not be adequate. Therefore, it is frequently desirable to have a first threshold for turning on the starting winding and a second threshold for turning off the starting winding, with the turn on threshold being higher than the turn off threshold. The he use of a bi-level threshold detection means assures that once the starting winding is turned off, it will not be turned on again until the motor is turned off and restarted. The use of a bi-level threshold means also aids in designing variance in the line current, temperature problems and the like. It also lends itself well to mass production of the appliance, relieving the necessity of selecting the components for the motor starting circuit with great accuracy and individually for each appliance. The above noted problems are even more acute when a sensing resistor is used as a sensing means, since in general the voltages from a sensing resistor are quite small.

Figure 10:
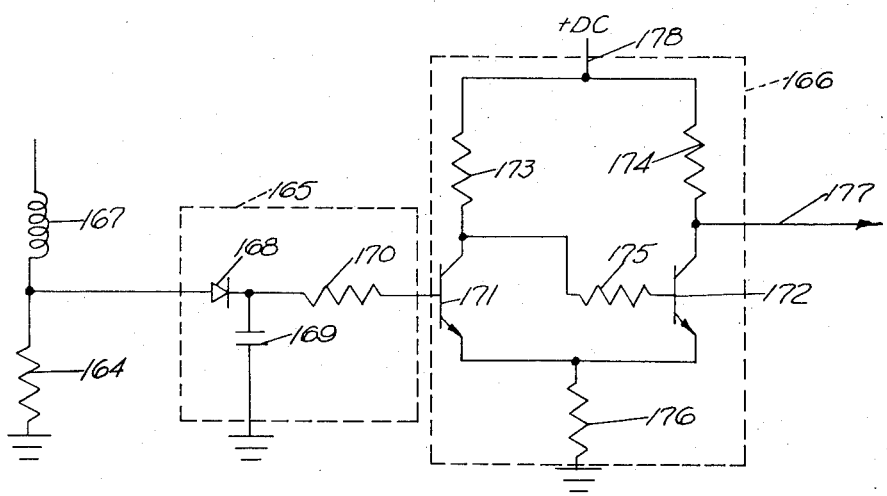
FIGS. 10 through 13 are simplified diagrammatic representations of the primary elements of FIGS. 8 and 9, illustrating the use of a bi-level threshold detection circuit.

FIG. 10 is a simplified, incomplete circuit diagram illustrating the primary components set forth in FIG. 8, and like parts have been given like index numerals. Thus, a sensing resistor is illustrated at 164, the memory circuit is is shown by the dashed rectangle at 165 and the threshold detection means is shown by the dashed rectangle at 166. The motor main winding is shown at 167.

The memory circuit 165 comprises a rectifying diode 168, a capacitor 169 and a resistor 170. This memory circuit is similar to those described above.

The threshold detection means 166 is a bi-level detection means. The bi-level detection means comprises a Schmitt trigger. The Schmitt trigger, in and of itself, is well known to the skilled worker in the art and comprises a pair of transistors 171 and 172, collector resistors 173 and 174, a resistor 175 connected to the base of the transistor 172 and the common emitter resistor 176 connected to ground. The output of the Schmitt trigger is shown at 177 and an input from a DC power source is shown at 178. As is well known to the worker skilled in the art, the Schmitt trigger will provide a turn on threshold and a turn off threshold, which can be adjusted independantly by adjusting the values of the collector resistors 173 and 174 and a common emitter resistor 176. The Schmitt trigger is also characterized by a snap-action, particularly desirable for the circuits of the present invention. In the diagram of FIG. 10, the output 177 of the Schmitt trigger will be a positive voltage approximately equivalent to the DC voltage input at 178 when the starting winding is to be turned on. Otherwise, the output at 177 will be approximately zero.

Figure 11:
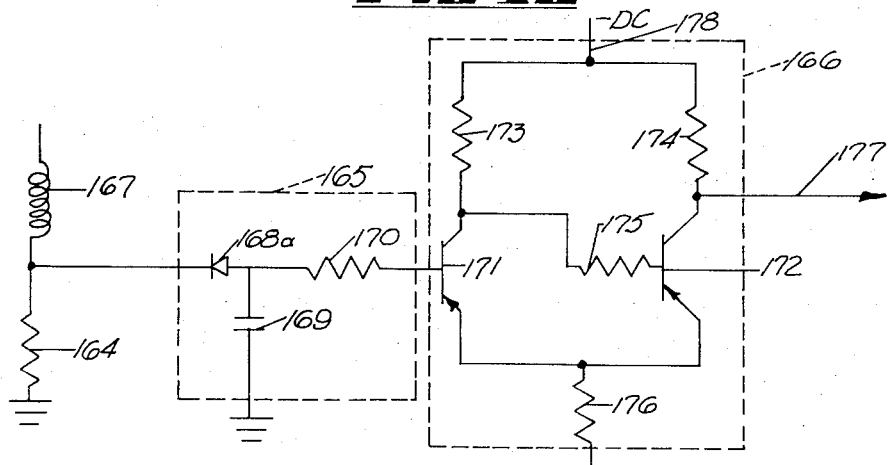

FIG. 11 is similar to FIG. 10, and like parts have been given like index numerals. In this instance, however, the rectifying diode 168a has been reversed, and the DC input at 178 is a negative DC voltage. Under these circumstances, the output at 177, when the starting winding is to be turned on, will be a negative voltage approximately equal to the negative DC voltage at input 178. Otherwise, the output at 177 will be approximately zero.

FIG. 12 is again similar to FIGS. 10 and 11 (like parts having been given like index numerals), but it illustrates the primary components in the order shown in FIG. 9. Thus, the output 177 of the Schmitt trigger drives the memory circuit 165. The output of the memory circuit is indicated at 179. When the starting winding is to be turned on, the output 179 will have a negative voltage approximately equal to the negative DC voltage at the input 178 of the Schmitt trigger. Otherwise, the output 179 will be approximately zero.

Figure 12:
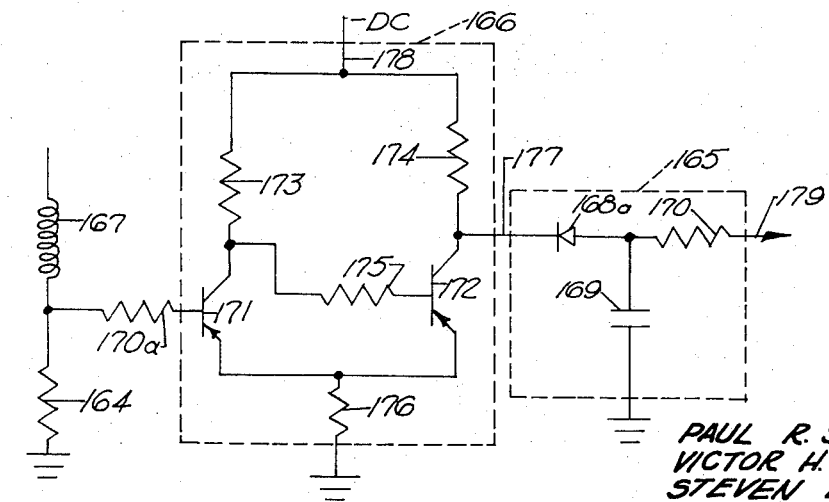

It should be noted that the circuit of FIG. 12 behaves as though the level detection means were single level rather than bi-level. This behavior occurs because the sinusoidal voltage from the sensing resistor 164 is being led directly to the input of the Schmitt trigger through resistor 170a. Thus. assuming the current in the main winding 167 is equal to or in excess of the level for which the starting winding is required, a strong negative voltage (approximately equal to the DC voltage 178) appears at 177, whenever the negative-going voltage across the sensing resistor 164 during the negative half period of the sinusoidal current through the main winding 167 exceeds in magnitude the turn-on level of the Schmitt trigger. The voltage at output 177 then reverts to essentially zero whenever the positive-going voltage across the sensing resistor 164 during the aforementioned negative half period is smaller in magnitude than the turn off level of the Schmitt trigger, and remains essentially zero during the positive half period of the sinusoidal current through the main winding 167. The memory circuit 168a through 170 then peak-detects the periodic transistions of the output 177 of the Schmitt trigger, and hence the output 179 exhibits a steady voltage essentially equal to the DC voltage at 178. When the current in the main winding 167 is below the level for which a start winding is required, the negative voltage from the sensing resistor never exceeds in magnitude the turn-on level of the Schmitt trigger, and thus both outputs 177 and 179 are steady at essentially zero volts.

Figure 13:
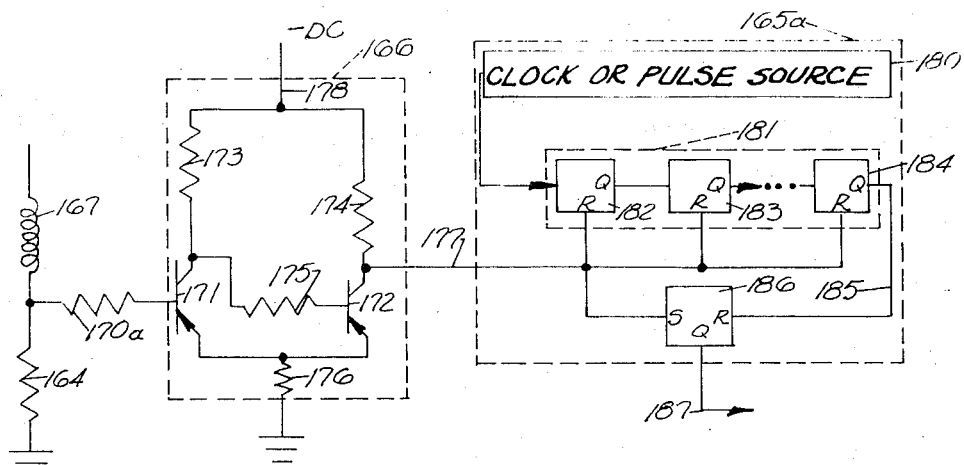

FIG. 13 is similar to FIG. 12 and like parts have been given like index numerals. In this instance, however, the memory circuit 165a is illustrated as being a digital memory curcuit. The memory circuit 165a is illustrated in the form of a logic diagram comprising a clock or pulse source 180 driving a digital counter 181 having a plurality of stages. The clock may comprise any suitable well known circuit and may be of the type which derives pulses from the line current. The digital counter is illustrated as having three stages 182, 183 and 184. The three dots between stages 183 and 184 are intended to indicate that additional stages may be present. The Q output 185 of the final stage 184 (i.e., the output of the digital counter 181) is connected to the reset input of a flip-flop 186. The Q output 187 of the flip-flop 186 is the output of the memory circuit.

The output 177 of the Schmitt trigger is connected to the reset input of each of the stages 182–184 of the digital counter 181. The output 177 is similarly connected to the set input of flip-flop 186. Thus, when the starting winding is to be turned on, the output 177 of the Schmitt trigger will send a logical one signal during part of each negative half period, as described above, to the reset input of each of the stages of the digital counter 181 so that the output 185 of the counter will be logical zero. Thus, a logical zero will appear at the reset input of flip-flop 186, while a logical one from the output 177 of the Schmitt trigger will appear at the set input of the flip-flop. As a result, the output of the memory circuit 165a at 187 will be logical. The period of the counter is greater than the period of the sinusoidal line power to the motor, and thus the output 187 of the memory circuit will remain logical one, even though the output 177 of the Schmitt trigger is fluctuating between logical one and logical zero at the frequency of the sinusoidal line power to the motor, as described previously.

When the starting winding is to be turned off, the output of the Schmitt trigger at 177 will be continuously logical zero. This logical zero will appear at the reset inputs of the digital counter stages 182–184, and at the set input of flip-flop 186. The output of the digital counter at 185 will remain logical one until the counter completes its full count whereupon the Q output of stage 184 will make a logical zero-logical one transition, providing a logical one at the reset input of flip-flop 186. When this happens, the output 187 of the memory circuit 165 will shift from logical one to logical zero.

All of the embodiments illustrated in FIGS. 10 through 13 have been illustrated as using a sensing resistor as a sensing means. It will be understood by one skilled in the art that a sensing transformer could be used after the manner described with respect to FIGS. 1 through 4.

When the memory circuit precedes the Schmitt trigger (as in FIGS. 8, 10 and 11) the memory circuit 165 provides a slowly varying signal which is converted to a definite output signal by the Schmitt trigger 166, as the on and off thresholds are reached. As the input to the Schmitt trigger reaches the start threshold level, the Schmitt trigger becomes unstable in the off state and mades a transition to the on state. where it is stable. This transition is characterized by a snap-action. As the input to the Schmitt trigger reaches the stop threshold, the Schmitt trigger becomes unstable in the on state and makes a transition to the off state with the same snap-action characteristic. Thus a slowly varying or barely adequate signal from the memory circuit 165 is converted to a definite signal by the Schmitt trigger with a snap-action.

When the memory circuit follows the Schmitt trigger (as in FIGS. 9, 12 and 13) the input of the Schmitt trigger is connected directly to the instantaneous output of the sensing means. As previously described, as the motor starts up the Schmitt trigger will snap on and off at the power line frequency each time the peak of the sensed current exceeds the turn on threshold until the motor reaches its normal operating speed and the peak of the sensed current no longer exceeds the turn on threshold, whereupon the Schmitt trigger will become stable in the off condition. The memory circuit will serve to maintain an on signal until the output of the Schmitt trigger becomes stable in the off condition.

Figure 14:
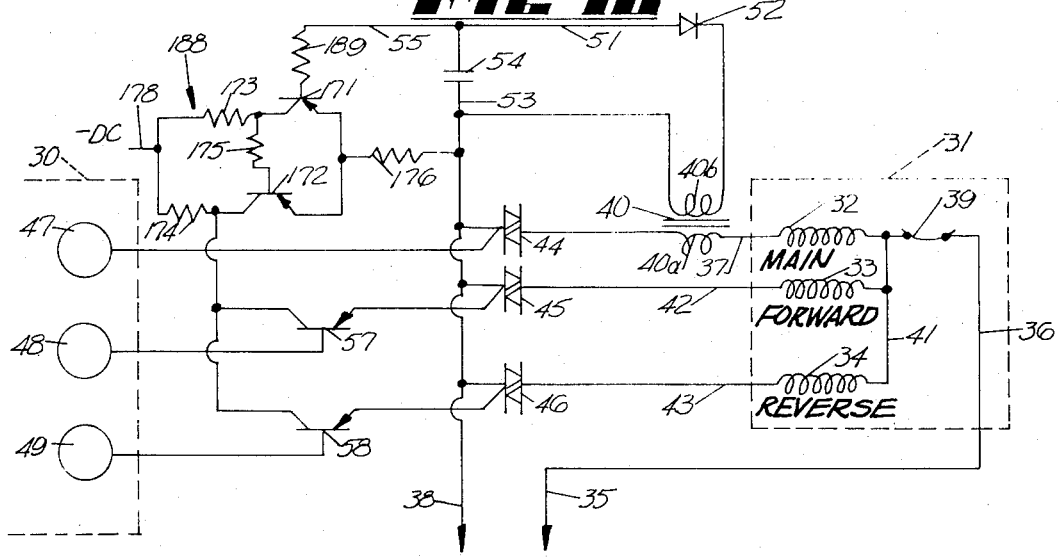
FIG. 14 illustrates the circuit of FIG. 2 provided with a bi-level detection circuit.

FIG. 14 illustrates the embodiment of FIG. 2 provided with a bi-level threshold detection means. Like parts have been given the same index numerals appearing in FIG. 2. In essence, the zener diode 56 of FIG. 2 has been replaced by the Schmitt trigger 188 and the resistor 189. For purposes of clarity, the components of the Schmitt trigger have been given the same index numerals as applied in FIGS. 10 through 13.

The input of the Schmitt trigger 188 is connected to lead 55. The output 177 of the Schmitt trigger is connected to the collectors of the two switching transistors 57 and 58. The resistor 176 is grounded to lead 38.

The operation of the embodiment of FIG. 14 will be substantially identical to the operation described with respect to FIG. 2. The presence of the bi-level threshold detecting means or Schmitt trigger 188, however, will assure that there will be a first threshold for turning on either of the starting windings 33 and 34, and a second threshold for turning off either of these starting windups. The first threshold will be at a higher voltage level than the second. It will be understood by one skilled in the art that the bi-level threshold detection means 188 could be applied to the embodiment of FIG. 7. It will be remembered that FIG. 7 differs from FIG. 2 only in that the sensing resistor 40c is substituted for the sensing transformer 40.

It will be readily understood that FIG. 14 conforms to the block diagram of FIG. 8. The transformer 40 is equivalent to the sensing means 164 of FIG. 8. The diode 52, capacitor 54 and resistor 189 constitute the memory circuit equivalent to memory circuit 165 of FIG. 8. Finally, the Schmitt trigger 188 corresponds to the threshold detecting means 165 of FIG. 8.

Figure 15:
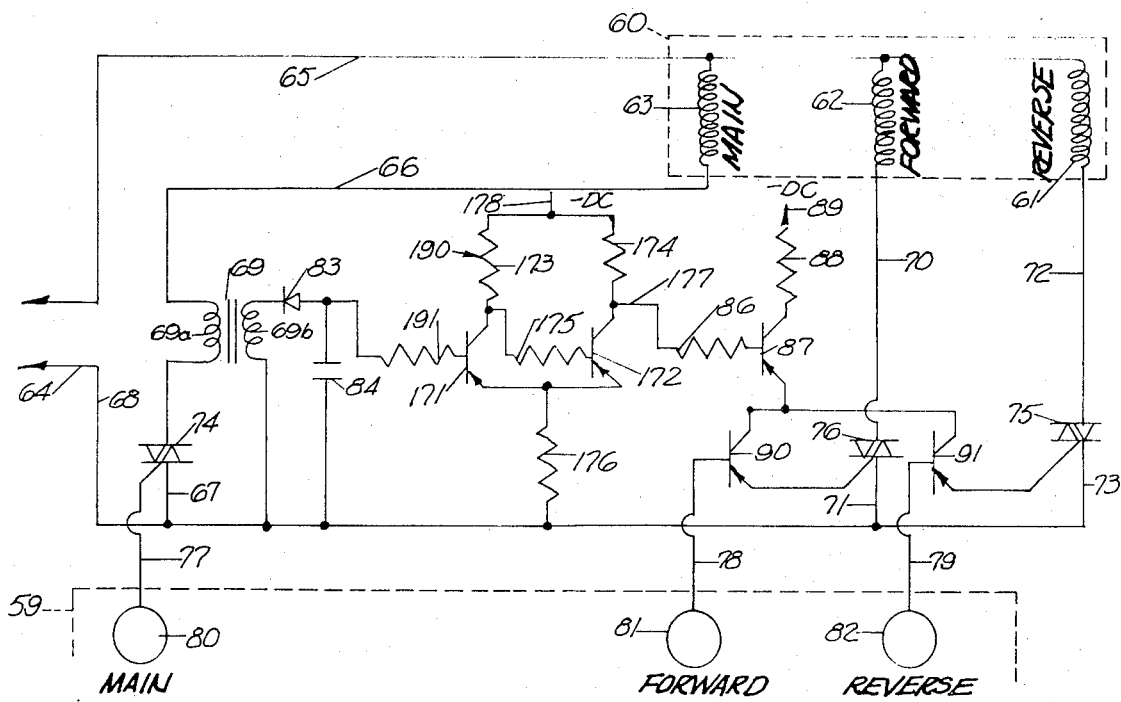
FIG. 15 illustrates the circuit of FIG. 3 provided with a bi-level threshold detection circuit.

FIG. 15 illustrates the application of a bi-level threshold detecting means to the embodiment of FIG. 3. For purposes of clarity, like parts have been given index numerals corresponding to those in FIG. 3. The bi-level threshold detecting means (a Schmitt trigger) is generally indicated at 190. It will be noted that FIG. 15 differs from FIG. 3 in that the secondary winding 69b, of the transformer 69, the capacitor 84 and the resistor 176 are grounded to lead 68.

It will be evident that the embodiment of FIG. 15 is substantially identical to that of FIG. 14, differing only in that the output 177 of the Schmitt trigger 190 is connected to an amplification circuit comprising elements 86 through 89. With this exception, the operation of FIG. 15 is identical to that described with respect to FIG. 14. It will be understood that the DC power source at 89 for the amplification circuit can be the same DC power source as is connected to the input 178 of the Schmitt trigger 190.

FIG. 15 again conforms to the block diagram of FIG. 8. The sensing means comprises the transformer 69. the memory circuit comprises the diode 83, capacitor 84 and resistor 191. The bi-level threshold detection means comprises the Schmitt trigger 190.

Figure 16:
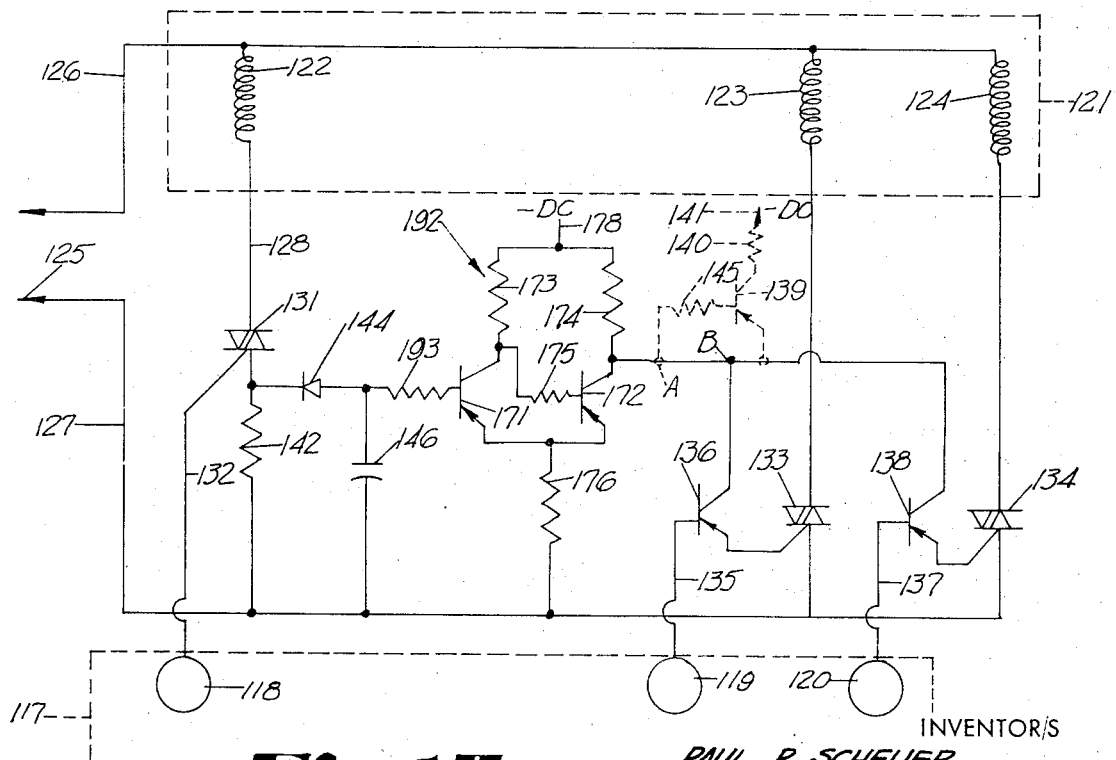
FIG. 16 illustrates the circuit of FIG. 5 provided with a bi-level threshold detection circuit.

FIG. 16 illustrates the provision of a bi-level threshold detection means to the circuit illustrated in FIG. 5. For purposes of clarity, like parts have been given the same index numerals as appear in FIG. 5. The bi-level threshold detection means is generally indicated at 192, and the components thereof have been given the same index numerals as appear in FIGS. 10 through 13.

That portion of the circuit of FIG. 16 shown in solid lines is substantially equivalent to that of FIG. 14 with the exception that a sensing resistor 142 is used, rather than the sensing transformer 40 of FIG. 14. The operation of the circuit of FIG. 16 is otherwise the same. The output of the Schmitt trigger 192 is connected directly to the collectors of switching transistors 136 and 138.

FIG. 16 also illustrates, in dotted lines, an amplification circuit identical to that shown in FIG. 5 and comprising elements 139, 140, 141 and 145. When the amplification circuit is to be used, there will be no connection between the points A and B. FIG. 15 is again an example of an arrangement of the primary elements in the order shown in FIG. 8. The sensing means comprises the sensing resistor 142. The memory circuit comprises the diode 144, capacitor 146 and resistor 193. The bi-level threshold detecting means comprises the Schmitt trigger 192.

Figure 17:
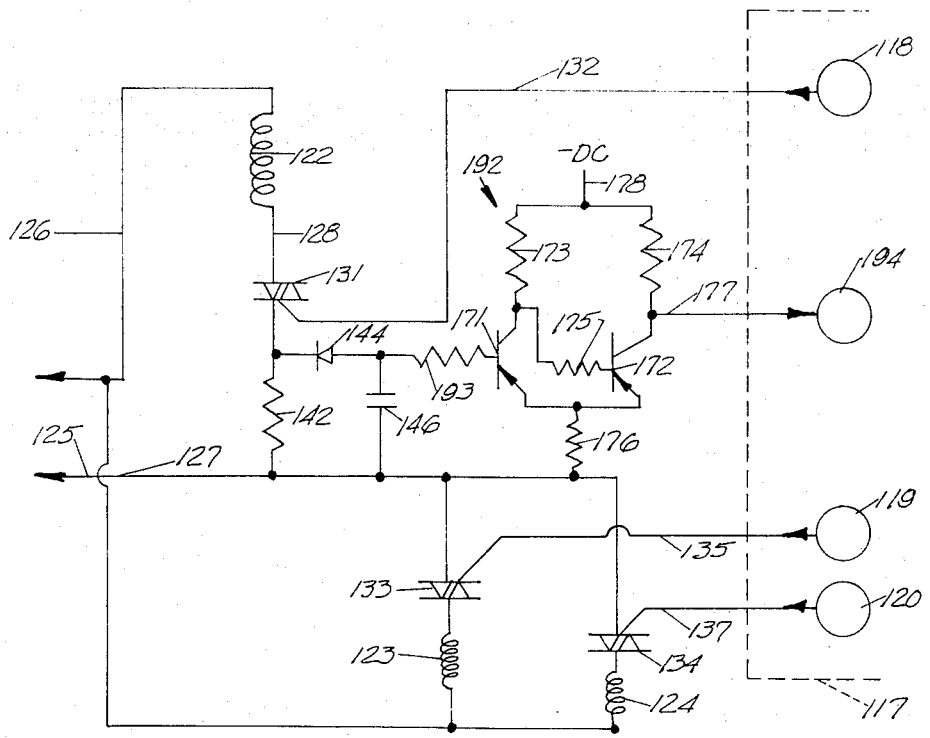
FIG. 17 illustrates the circuit of FIG. 16 wherein the output of the bi-level threshold detection circuit is transmitted to the interfacing devices via a logic circuit.

FIG. 17 illustrates the embodiment of FIG. 16 with the output of the Schmitt trigger going to the logic circuit. Like parts have been given like index numerals. The embodiment of FIG. 17 is substantially identical to that of FIG. 16 except that the output 177 of Schmitt trigger 192 goes to an input 194 of the logic circuit 117. It will be noted that the switching transistors 136 and 138 of FIG. 16 have been eliminated, since the logic circuit will perform their function. As a consequence, the gate of the interfacing device 133 can be connected directly to the output 119 of the logic circuit, via lead 135. Similarly, the interfacing device 134 may be connected to the logic circuit output 120 via lead 137.

When the motor is started, the current through the main winding 122 will be sensed by the sensing resistor 142 and the memory circuit comprising diode 144, capacitor 146 and resistor 193. When the start threshold (established by the Schmitt trigger 192) is reached, the Schmitt trigger will provide a logical one at its output 177. This logical one will cause the logic circuit 117 to have a logical one at either its output 119 or its output 120. The logic circuit will also select which of these outputs will have the logical one signal. In this way, the selected one of interfacing devices 133 and 134 will be rendered conductive and the selected one of starting windings 123 and 124 will be energized.

When the motor reaches its normal running speed, the sensed current in main winding 122 will diminish to the point where the Schmitt trigger 192 will become unstable in its on condition and will snap to its off condition providing a logical zero at its output 177. This logical zero will appear at both outputs 119 and 120 of the logic circuit 117 with the result that the previously selected one of interfacing devices 133 and 134 will become nonconductive and the selected one of starting windings 123 and 124 will be turned off. The starting winding which was not selected will, of course, remain deenergized.

Figure 18:
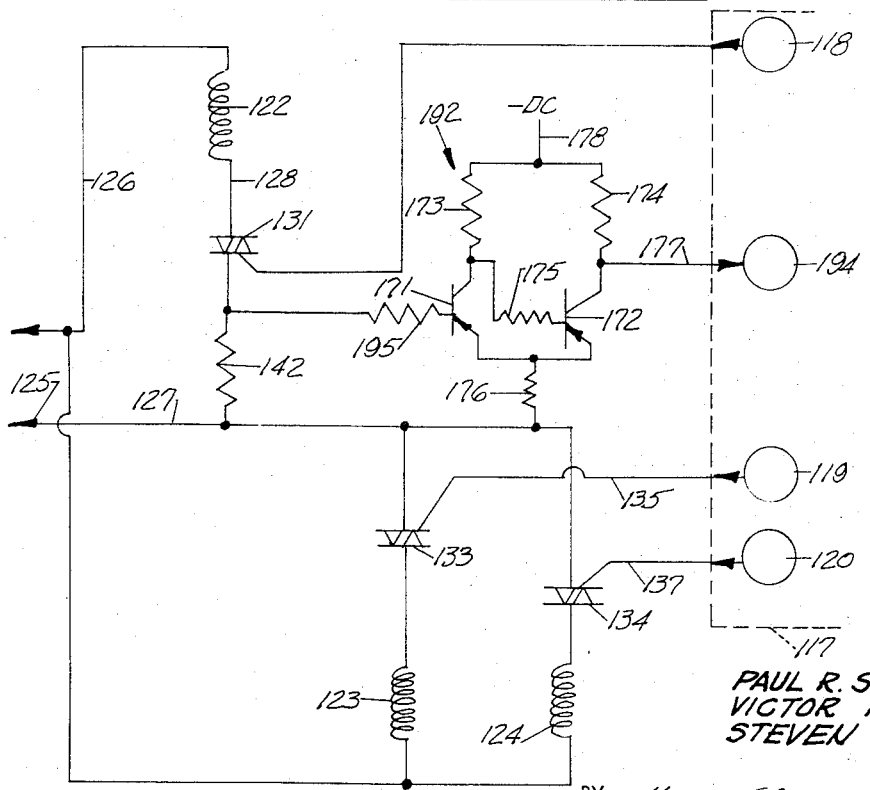
FIG. 18 illustrates the circuit of FIG. 16 modified as shown in FIG. 13, with the memory circuit incorporated in the logic circuit.

FIG. 18 is similar to FIG. 17 and like parts have been given like index numerals. FIG. 18 differs from FIG. 17 in that the memory circuit (i.e., the diode 144, the capacitor 146 and the resistor 193) have been eliminated. In this embodiment, the function of the memory circuit has been incorporated in the logic circuit 117, in a manner similar to that shown in FIG. 13. The resistor 195 simply serves as a protective resistor for the Schmitt trigger 192.

The operation of FIG. 18 will be substantially identical to that described with respect to FIG. 17, with the exception that the function of the memory circuit is performed by the logic circuit 117, in a manner similar to that shown in FIG. 13. Since this is true, the embodiment of FIG. 18 has the primary elements in the arrangement shown in FIG. 9, above.

Figure 19:
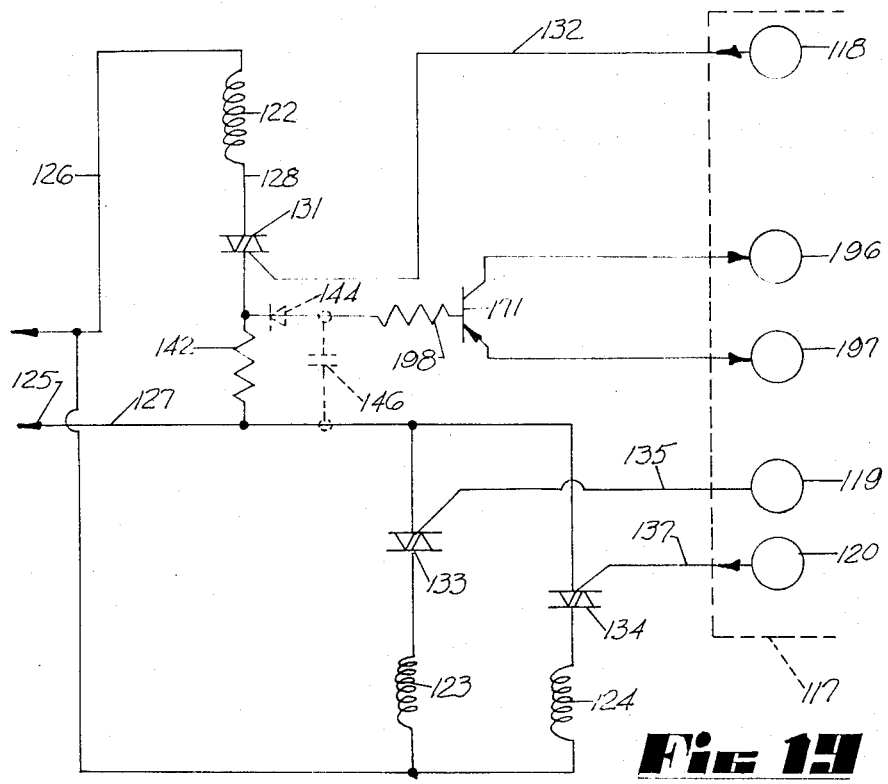
FIG. 19 is similar to FIG. 18, but illustrates a portion of the threshold detection circuit as incorporated in a logic circuit.

FIG. 19 is similar to FIG. 18 and like parts have been given like index numerals. FIG. 19 differs from FIG. 18 in that the logic circuit 117 incorporates most of the bi-level threshold detection means, or Schmitt trigger. Thus, the transistor 171 will be connected to a pair of inputs 196 and 197 in the logic circuit. Again, the resistor 198 serves the same purpose as resistor 195 of FIG. 18, acting as a protective resistor for transistor 171. Thus, in the circuit shown in solid lines in FIG. 19, the logic circuit 117 performs the functions of both the memory circuit and the major portion of the Schmitt trigger.

The diode 144 and capacitor 146 are shown in dotted lines in FIG. 19. This is to indicate that a memory circuit of the type shown in FIG. 17 may be incorporated ahead of the transistor 171. Under these circumstances, the resistor 198 serves as a part of the memory circuit and the logic circuit 117 no longer performs the function of the memory circuit.

The operation of the circuit of FIG. 19 (as shown in solid lines) is substantially the same as that of the circuit of FIG. 18, with the exception that the logic circuit 117 will perform a part of the function of the bi-level threshold detection means. Thus, this circuit conforms to the diagram of FIG. 9. If a memory circuit is incorporated (as shown in dotted lines) this circuit then conforms to the diagram of FIG. 8 and performs in substantially the same manner as that described with respect to FIG. 17, again with the exception that the logic circuit 117 will perform a part of the function of the bi-level threshold detection means.

Figure 20:
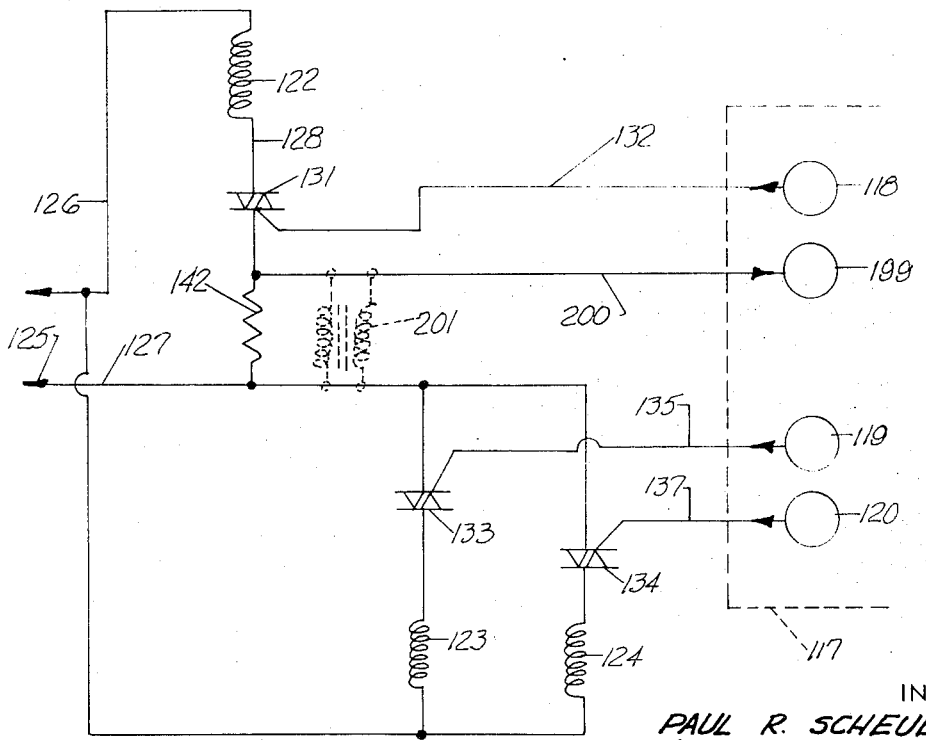
FIG. 20 is similar to FIG. 18, but illustrates both the memory circuit and the bi-level threshold detection circuit as being incorporated in the logic circuit.

FIG. 20 is similar to FIG. 19 and like parts have been given like index numerals. FIG. 20 is simply intended to show that the logic circuit 117 may incorporate both the function of the threshold detection means and the function of the memory circuit. Under these circumstances, an input 199 of the logic circuit will be connected directly to the sensing resistor 142 by lead 200. The operation of FIG. 20 will otherwise be substantially identical to that described with respect to FIGS. 17 through 19.

It will be understood by one skilled in the art that in any of the circuits illustrated in FIGS. 17 through 20, a sensing transformer may be substituted for the sensing resistor 142. This is illustrated, for example, in FIG. 20 wherein a sensing transformer is shown in dotted lines at 201. It will be understood that when transformer 201 is used, the resistor 142 will be eliminated, as will the connections between the terminals of the transformer primary and secondary.

Modifications may be made in the invention without departing from the spirit of it.

The embodiments of the invention in which an exclusive property or privilege is claimed are defined as follows:

1. A circuit for the automatic starting of an induction motor of the type having a main running winding, a first starting winding and a second starting winding to cause said motor to run in a direction opposite to that initiated by said first starting winding, said circuit comprising a source of electrical energy and first and second leads therefrom, a third lead containing in series said main running winding and means for sensing the current drawn by said main running winding and producing an electric signal proportional thereto, a fourth lead containing in series said first starting winding and a first bi-directional semi-conductor switch, a fifth lead, said fifth lead containing in series said second starting winding and a second bi-directional semi-conductor switch, means to connect and disconnect said third, fourth and fifth leads across said first and second leads, means for conducting said sensing means signal to start and stop threshold detecting means calibrated to pass a start signal at voltages in excess of that voltage sensing means signal which exists when said motor is running at normal speed, an integrated logic circuit having first, second and third outputs, said means for connecting and disconnecting said third lead across said first and second leads comprising a third bi-directional semi-conductor switch connected in series with said main running winding and said sensing means in said third lead, said first output of said integrated logic circuit being connected to the gate of said third bi-directional semi-conductor switch, said means for connecting and disconnecting said fourth and fifth leads across said first and second leads comprising a first switching transistor and a second switching transistor, said threshold detecting means being connected to the collectors of said first and second switching transistors, the emitters of said first and second transistors being connected to the gates of said first and second bi-directional semi-conductor switches respectively, said second and third outputs of said integrated circuit being connected to the bases of said first and second switching transistors respectively, whereby when said first and second logic circuit outputs provide a logical 1 at the gate of said third bi-directional semi-conductor switch and the base of said first switching transistor respectively, and said third output provides a logical zero at the base of said second switching transistor, said third and fourth leads are connected across said first and second leads and said fifth lead is disconnected therefrom, said main winding will be energized, said second starting winding will be deenergized and said first starting winding will be energized for so long as said threshold detecting means transmits said start signal, and when said first and third logic circuit outputs provide a logical 1 at the gate of said third bi-directional semi-conductor switch and the base of said second switching transistor respectively, and said second output provides a logical zero at the base of said first switching transistor, said third and fifth leads are connected across said first and second leads and said fourth lead is disconnected therefrom, said main running winding will be energized, said first starting winding will be deenergized and said second starting winding will be energized for so long as said threshold detecting means transmits said start signal.

2. The structure claimed in claim 1 wherein said current sensing means comprises a transformer, said trnasformer having a primary portion in series with said main motor winding in said third lead, said transformer having a secondary portion, said proportional signal being induced in said secondary portion.

3. The structure claimed in claim 1 wherein said means for sensing the current drawn by said main running winding comprises a resistor in series with said main running winding in said third lead.

4. The structure claimed in claim 1 wherein said means for conducting said sensing means signal to said threshold detecting device is a memory circuit comprising a diode-capacitor half-wave rectifier in series with a resistor being so connected between said second and third leads that the DC voltage appearing across said capacitor is proportional to the current flowing in said main running winding.

5. The structure claimed in claim 1 wherein said threshold detecting means is a single level detecting means.

6. The structure claimed in claim 1 wherein said threshold detecting means is a bi-level detecting means calibrated to initiate said start signal at a first sensed voltage level and to terminate said start signal at a second sensed voltage level, said first sensed voltage level being higher than said second sensed voltage lead.

7. The structure claimed in claim 1 including a third switching transistor between said threshold detecting means and said first and second switching transistors, said threshold detecting means being connected through a first resistor to the base of said third switching transistor, the collector of said third switching transistor being connected through a second resistor to a source of DC power, the emittor of said third switching transistor being connected to the collectors of said first and second switching transistors.

8. The structure claimed in claim 4 wherein said memory circuit has an output connected to said threshold detecting means, said threshold detecting means being a single level detecting means.

9. The structure claimed in claim 4 wherein said memory circuit has an output connected to said threshold detecting means, said threshold detecting means being a bi-level detecting means calibrated to initiate said start signal at a first sensed voltage level and to terminate said start signal at a second sensed voltage level, said first sensed voltage level being higher than said second sensed voltage level.

10. The structure claimed in claim 5 wherein said threshold detecting means comprises a zener diode.

11. The structure claimed in claim 5 wherein said threshold detecting means comprises a resistor.

12. The structure claimed in claim 6 wherein said bi-level detecting means comprises a Schmitt trigger and a source of DC current for said Schmitt trigger.

13. The structure claimed in claim 6 wherein said threshold detecting means has an input to receive the output of said sensing means, a memory circuit in said connection between said detecting means and said collectors of said first and second switching transistors, said memory circuit comprising a diode-capacitor half-wave rectifier in series with a resistor.

14. The structure claimed in claim 9 wherein said bi-level detecting means comprises a Schmitt trigger and a source of DC current for said Schmitt trigger.

15. The structure claimed in claim 9 including a third switching transistor between said threshold detecting means and said first and second switching transistors, said threshold detecting means being connected through a first resistor to the base of said third switching transistor, the collector of said third switching transistor being connected through a second resistor to source of DC power, the emitter of said third switching transistor being connected to the collectors of said first and second switching transistors.

16. The structure claimed in claim 9 wherein said logic circuit incorporates said first and second switching transistors, said second and third outputs of said logic circuit being connected directly to said gates of said first and second bi-directional semi-conductor switches, said logic circuit having an input for said start signal from said threshold detecting means.

17. The structure claimed in claim 9 wherein said logic circuit incorporates said first and second switching transistors, said second and third outputs of said logic circuit being connected directly to said gates of said first and second bi-directional semi-conductor switches, said logic circuit incorporating a part at least of said threshold detecting means.

18. The structure claimed in claim 9 wherein said logic circuit incorporates said first and second switching transistors, said second and third outputs of said logic circuit being connected directly to said gates of said first and second bi-directional semi-conductor switches, said logic circuit incorporating said memory circuit and said threshold detecting means and having an input for a signal from said sensing means.

19. The structure claimed in claim 13 wherein said logic circuit incorporates said first and second switching transistors, said second and third outputs of said logic circuit being connected directly to said gates of said first and second bi-directional semi-conductor switches, said logic circuit incorporating said memory circuit and having an input for said start signal from said threshold detecting means.

20. The structure claimed in claim 13 wherein said logic circuit incorporates said first and second switching transistors, said second and third outputs of said logic circuit being connected directly to said gates of said first and second bi-directional semi-conductor switches, said logic circuit incorporating said memory circuit and said threshold detecting means and having an input for a signal from said sensing means.

* * * * *